United States Patent
Guyer et al.

(10) Patent No.: US 11,144,454 B2
(45) Date of Patent: Oct. 12, 2021

(54) ENHANCED VAULT SAVE WITH COMPRESSION

(71) Applicant: EMC IP HOLDING COMPANY LLC, Hopkinton, MA (US)

(72) Inventors: James Guyer, Northboro, MA (US); Jason Duquette, Milford, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/691,657

(22) Filed: Nov. 22, 2019

(65) Prior Publication Data

US 2021/0157726 A1    May 27, 2021

(51) Int. Cl.
*G06F 12/0804* (2016.01)
*G06F 3/06* (2006.01)

(52) U.S. Cl.
CPC .......... *G06F 12/0804* (2013.01); *G06F 3/067* (2013.01); *G06F 3/0625* (2013.01); *G06F 3/0661* (2013.01)

(58) Field of Classification Search
CPC .. G06F 12/0804; G06F 3/0625; G06F 3/0661; G06F 3/067
See application file for complete search history.

(56) References Cited

U.S. PATENT DOCUMENTS

| | | | |
|---|---|---|---|
| 10,678,480 B1* | 6/2020 | Armangau | G06F 3/067 |
| 2005/0246362 A1* | 11/2005 | Borland | G06F 16/10 |
| 2011/0093650 A1* | 4/2011 | Kwon | G06F 12/0246 711/103 |
| 2013/0054835 A1* | 2/2013 | Sliger | H04L 69/04 709/247 |
| 2015/0301946 A1* | 10/2015 | Guo | G06F 9/45558 711/6 |
| 2017/0249248 A1* | 8/2017 | Nguyen | G06F 11/3062 |
| 2020/0019507 A1* | 1/2020 | Cho | G06F 12/0246 |

* cited by examiner

*Primary Examiner* — Idriss N Alrobaye
*Assistant Examiner* — Sakhr A Aldaylam
(74) *Attorney, Agent, or Firm* — Anderson Gorecki LLP

(57) ABSTRACT

Metadata in volatile memory is selectively compressed and destaged to non-volatile storage in the event of an emergency shutdown due to loss of like power. Compression offload hardware that is normally used for data compression is used to compress the metadata, e.g. at line speed. The compressed metadata and any uncompressed metadata that was not selected for compression may be destaged to vault drives along with compressed and uncompressed data that is in the volatile memory. Compression during vaulting may decrease power consumption when operating under standby battery power.

14 Claims, 2 Drawing Sheets

ENHANCED VAULT SAVE WITH COMPRESSION

TECHNICAL FIELD

The subject matter of this disclosure is generally related to emergency shutdown of an electronic system in the event of loss of line power, and more particularly to destaging metadata and data from volatile memory to non-volatile storage during the emergency shutdown.

BACKGROUND

Data centers are used to maintain large data sets, e.g. hundreds of gigabytes, associated with critical functions for which avoidance of data loss and maintenance of data availability are important. Key building blocks of a data center may include host servers, NAS (network-attached storage), and SANs (storage area networks). NAS servers and gateways can be used to provide multiple client computers with file-level access to the same logical volume of data. The files that are stored by a NAS server on a logical volume may be presented in a folder or other standard OS (operating system) feature on each client computer. A SAN can be used to provide multiple host servers with block-level access to the same logical volume of data. The SAN includes a network of compute nodes that manage access to arrays of drives. SANs create logical volumes of storage that are used by instances of host applications such as block servers and email servers that run on the host servers. Each logical volume has a volume ID and contiguous logical address space. The host servers send block-level IO (input-output) commands to the SAN to access the logical volumes. Because they are block-based, SANs are unaware of higher-level data structures such as files. SANs have advantages over NAS in terms of potential storage capacity and scalability, but file-based NAS systems may be preferred by some organizations based on ease of use.

Storage systems may be equipped with a reserve power source for emergency shutdown in the event of loss of line power. The reserve power source is used to provide the storage system with enough power to copy the contents of volatile memory to non-volatile storage in order to avoid data loss. A common type of reserve power source is a lithium ion battery. Problematically, the batteries needed for SAN and NAS nodes tend to be large, costly, and trigger strict shipping regulations and EPO (emergency power off) standards.

SUMMARY

All examples, aspects and features mentioned in this document can be combined in any technically possible way.

In accordance with some implementations an apparatus comprises: a processor; volatile memory in which metadata is maintained; non-volatile storage media; a standby power source; and power conservation logic responsive to loss of line power and emergency shutdown under power provided by the standby power source to select at least some of the metadata to be compressed into compressed metadata prompts storage of the compressed metadata on the non-volatile storage media. Some implementations comprise compression offload hardware that compresses data being copied from the volatile memory to the non-volatile storage media when line power is available, the compression offload hardware being used to generate the compressed metadata in response to loss of line power and emergency shutdown under power provided by the standby power source. In some implementations, wherein the non-volatile storage media comprises managed drives and vault drives, the compressed metadata is destaged to the vault drives in response to loss of line power and emergency shutdown under power provided by the standby power source. In some implementations the power conservation logic selects at least some data to be compressed into compressed data that is destaged to the non-volatile storage media responsive to loss of line power and emergency shutdown under power provided by the standby power source. In some implementations, wherein the non-volatile storage media comprises managed drives and vault drives, the compressed data and compressed metadata are destaged to the vault drives responsive to loss of line power and emergency shutdown under power provided by the standby power source. In some implementations metadata that is not selected for compression is stored in an uncompressed state on the non-volatile storage in response to loss of line power and emergency shutdown under power provided by the standby power source. In some implementations data that is not selected for compression is stored in an uncompressed state on the non-volatile storage in response to loss of line power and emergency shutdown under power provided by the standby power source.

In accordance with some implementations a method comprises: in a node comprising a processor, volatile memory in which metadata is maintained, non-volatile storage media, and a standby power source: detecting loss of line power; responsive to the loss of line power, initiating emergency shutdown under power provided by the standby power source, comprising selecting at least some of the metadata to be compressed into compressed metadata and prompting storage of the compressed metadata on the non-volatile storage media. Some implementations comprise using compression offload hardware, that compresses data being copied from the volatile memory to the non-volatile storage media when line power is available, to generate the compressed metadata in response to loss of line power and emergency shutdown under power provided by the standby power source. Some implementations, wherein the non-volatile storage media comprises managed drives and vault drives, comprise destaging the compressed metadata to the vault drives in response to loss of line power and emergency shutdown under power provided by the standby power source. Some implementations comprise selecting at least some data to be compressed into compressed data and destaging that compressed data to the non-volatile storage media responsive to loss of line power and emergency shutdown under power provided by the standby power source. Some implementations, wherein the non-volatile storage media comprises managed drives and vault drives, comprise destaging the compressed data and compressed metadata to the vault drives responsive to loss of line power and emergency shutdown under power provided by the standby power source. Some implementations comprise storing metadata that is not selected for compression in an uncompressed state on the non-volatile storage in response to loss of line power and emergency shutdown under power provided by the standby power source. Some implementations comprise storing data that is not selected for compression in an uncompressed state on the non-volatile storage in response to loss of line power and emergency shutdown under power provided by the standby power source.

In accordance with some implementations a computer-readable non-transitory storage media on which is stored computer program code comprises: power conservation logic responsive to loss of line power and emergency shutdown under power provided by a standby power source to select at least some metadata to be compressed into compressed metadata that is stored on at least one vault drive. Some implementations comprise instructions that cause compression offload hardware to generate the compressed metadata in response to loss of line power and emergency shutdown under power provided by the standby power source. Some implementations comprise instructions that select at least some data to be compressed into compressed data and destage that compressed data to the at least one vault drive responsive to loss of line power and emergency shutdown under power provided by the standby power source. Some implementations comprise instructions that store metadata that is not selected for compression in an uncompressed state on the at least one vault drive in response to loss of line power and emergency shutdown under power provided by the standby power source. Some implementations comprise instructions that store data that is not selected for compression in an uncompressed state on the at least one vault drive in response to loss of line power and emergency shutdown under power provided by the standby power source. In some implementations the computer-readable non-transitory storage media is implemented in a SAN (storage area network) node.

Other aspects, features, and implementations may become apparent in view of the detailed description and figures.

DETAILED DESCRIPTION

Aspects of the inventive concepts will be described as implemented in a data storage system such as a SAN node, e.g. a storage array. Such an implementation should not be viewed as limiting because the inventive concepts have wider applicability. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
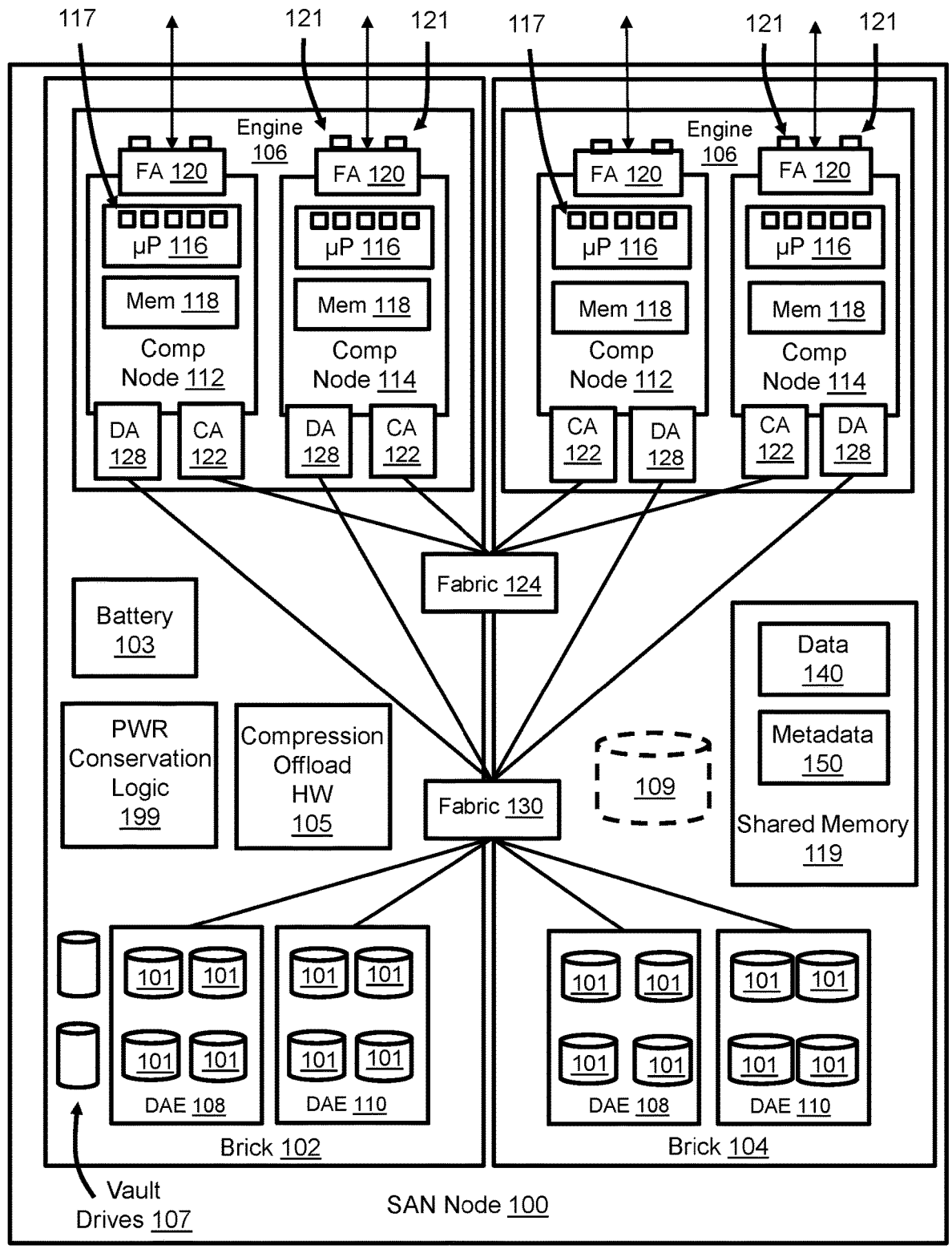
FIG. 1 illustrates a SAN node with power conservation logic for emergency shutdown.

FIG. 1 illustrates a SAN node 100 with power conservation logic 199. The power conservation logic implements steps associated with a vault save to help assure avoidance of data loss in the event of an emergency shutdown due to loss of AC line power. A battery 103 or other emergency power source is included to provide power to the SAN node to complete vault save procedures without line power. Battery 103 may include multiple lithium-ion standby power supply (Li-Ion SPS) modules. The number and location of Li-Ion SPS modules depends on the type of system bays and the number of engines in the SAN node.

The SAN node 100, which may be referred to as a storage array, includes one or more bricks 102, 104. Each brick includes an engine 106 and one or more drive array enclosures (DAEs) 108, 110. Each DAE includes managed drives 101 of one or more technology types. Examples may include, without limitation, solid state drives (SSDs) such as flash and hard disk drives (HDDs) with spinning disk storage media with some known storage capacity. Each DAE might include any number of managed drives, but the figure is simplified for purposes of illustration. Each engine 106 includes a pair of interconnected computing nodes 112, 114, which are sometimes referred to as "storage directors." Each computing node includes at least one multi-core processor 116 and local memory 118. The processor may include CPUs, GPUs, or both, and the number of cores 117 is known. The local memory 125 may include volatile random-access memory (RAM) of any type. Each computing node includes one or more front-end adapters (FAs) 120 with ports 121 for communicating with the hosts. The FAs have ports and the hosts may access the SAN node via multiple ports in a typical implementation. Each computing node also includes one or more drive adapters (DAs) 122 for communicating with the managed drives 101 in the DAEs 108, 110. Each computing node may also include one or more channel adapters (CAs) 122 for communicating with other computing nodes via an interconnecting fabric 124. Each computing node may allocate a portion or partition of its respective local memory 118 to a shared memory 119 that can be accessed by other computing nodes, e.g. via direct memory access (DMA) or remote direct memory access (RDMA). The paired computing nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN node can access every managed drive 101 in the SAN node. Compression offload hardware 105 is normally used to provide line-speed compression/decompression of data being copied between the shared memory and managed drives. Not all data is stored in a compressed state on the managed drives, but the compression offload hardware helps to avoid imposing a compression/decompression burden on the computing node processors that might degrade performance. In some implementations the compression offload hardware is used to compress data that is being demoted to lower performance storage media due to inactivity, i.e. absence of recent access of the data.

The managed drives 101 are not discoverable by the hosts but the SAN node 100 creates a logical storage device 109 that can be discovered and accessed by the hosts. The logical storage device is used by host applications for storage of host application data. Without limitation, the logical storage device may be referred to as a production volume, production device, or production LUN, where LUN (Logical Unit Number) is a number used to identify the logical storage volume in accordance with the SCSI (Small Computer System Interface) protocol if that is supported (the inventive aspects are not limited to use with any specific protocols or type of storage system). From the perspective of the hosts the logical storage device is a single drive having a set of contiguous fixed-size logical block addresses (LBAs) on which data used by instances of the host application resides. However, the host application data is stored at non-contiguous addresses on various managed drives 101.

To service IOs from instances of a host application the SAN node 100 maintains metadata 150 that indicates, among various things, mappings between LBAs of the logical storage device 109 and addresses with which extents of host application data can be accessed from the shared memory 119 and managed drives 101. In response to a data access command from an instance of the host application to read data from the production volume the SAN node uses the metadata 150 to find the requested data in the shared memory or managed drives. Some host application data 140, e.g. recently accessed data, is present in the shared memory. The data 140 in the shared memory is paged-in and paged-out based on need and least recent use. When the requested data is already present in shared memory when the command is received it is considered a "cache hit." When the requested data is not in the shared memory when the command is received it is considered a "cache miss." In the event of a cache miss the accessed data is temporarily copied into the shared memory 119 from the managed drives 101 and used to service the IO, i.e. reply to the host application with the data via one of the computing nodes. The least recently used data in the shared memory may be paged-out to free space for the data being copied into the shared memory. In the case of an IO to write data to the production volume the SAN node copies the data into the shared memory 119, marks the corresponding logical storage device location as dirty in the metadata 150, and creates new metadata that maps the logical storage device address with a location to which the data is eventually written on the managed drives. Read and write "hits" and "misses" occur depending on whether the stale data associated with the IO is present in the shared memory when the IO is received.

During normal operation the portion of the shared memory used to maintain data 140 may become full. Some of that data 140 may only exist in the shared memory. Various associated new and updated metadata 150 records may exist only in the shared memory until there is spare processing capacity to destage those metadata records to the managed drives. In the event of an emergency shutdown due to loss of line power, any of the data 140 and metadata 150 that has not been destaged from volatile memory when all power is lost may be lost. Consequently, a significant amount of data and metadata may have to be destaged from the shared memory to the managed drives to avoid data and metadata loss in the event of an emergency shutdown. Dedicated vault drives 107 may be implemented to facilitate destaging of data and metadata during an emergency shutdown. The vault drives may include high performance media such as flash drives that is maintained with enough spare capacity to accommodate the contents of the shared memory.

Figure 2:
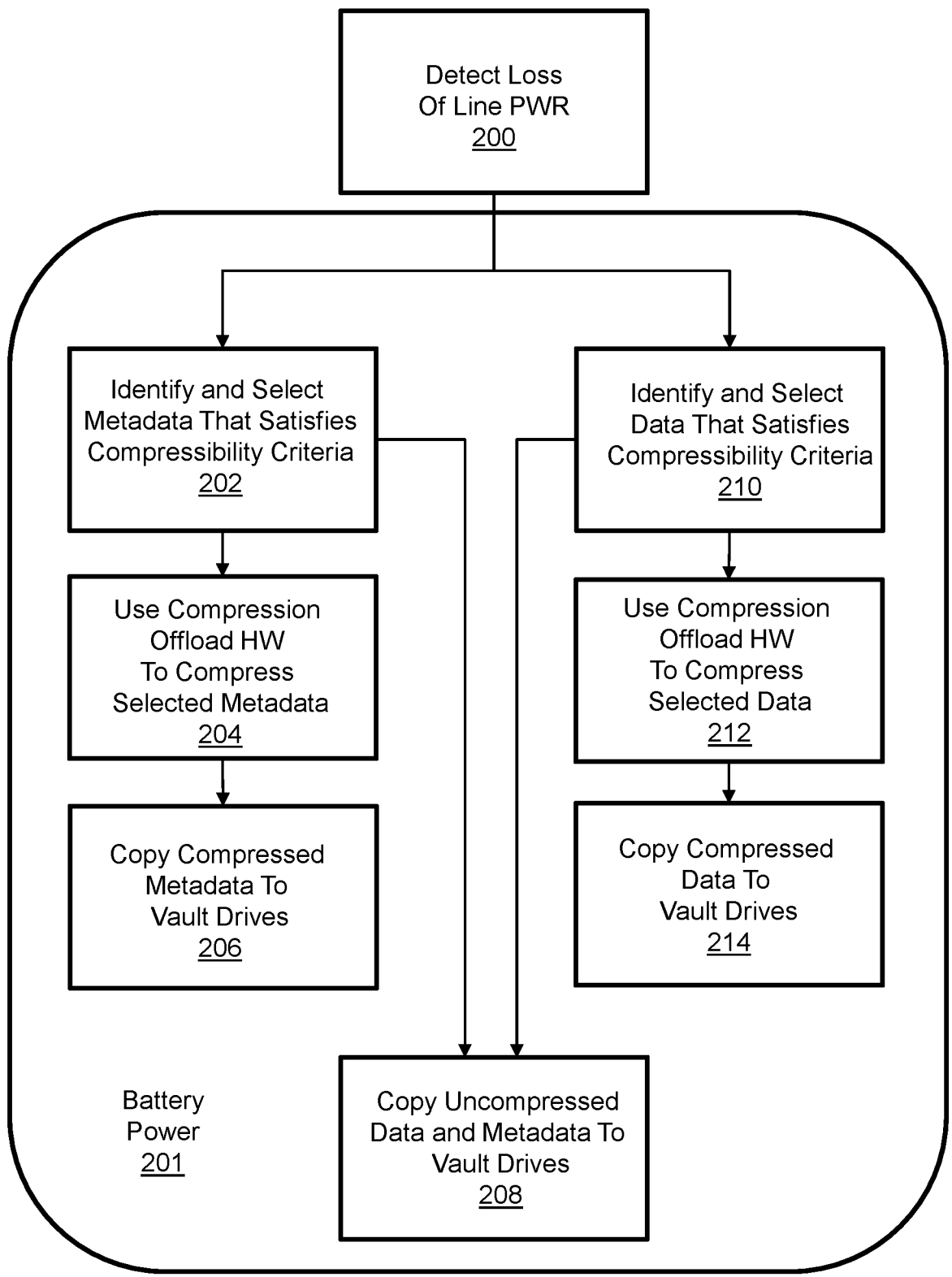
FIG. 2 illustrates operation of the power conservation logic of FIG. 1.

FIG. 2 illustrates operation of the power conservation logic 199 of FIG. 1. A vaulting process begins upon detection of loss of line power as indicated in step 200. When line power is lost, the battery 103 (FIG. 1) is used to power the SAN node while data and metadata are destaged from the shared memory as indicated at step 201. The power conservation logic identifies and selects metadata in the shared memory that satisfies predefined compressibility criteria. As described above, the metadata includes mappings between LBAs of the logical storage device and addresses on the managed drives. Because the LBAs of the logical storage device are contiguous, the metadata will include various ranges of contiguous LBAs. The metadata associated with each of those ranges of LBAs may be highly compressible due to similarities such as LBAs that increment by "1." Step 202 may include estimating the compressibility of metadata and selecting records that satisfy a compressibility threshold. Alternatively, or additionally, the power conservation logic may identify and select types of metadata records that are known to be highly compressible. The selected metadata is provided to the compression offload hardware for compression as indicated at step 204. Although the compression offload hardware is normally used only for data compression and decompression it is suitable for compressing metadata during emergency vaulting. The compressed metadata generated by the compression offload hardware is stored on the vault drives as indicated in step 206. The metadata from shared memory that was not selected in step 202 is copied in an uncompressed state to the vault drives as indicated in step 208. This may be done in parallel with steps 204 and 206.

The power conservation logic also identifies and selects data in the shared memory that satisfies predefined compressibility criteria as indicated in step 210. Step 210 may include estimating the compressibility of the data and selecting records that satisfy a compressibility threshold. In general, the structure of the data is less predictable than the structure of the metadata. However, compressibility can be quickly estimated. The selected data is provided to the compression offload hardware for compression as indicated at step 212. The compressed data generated by the compression offload hardware is stored on the vault drives as indicated in step 214. The data from shared memory that was not selected in step 210 is copied in an uncompressed state to the vault drives as indicated in step 208. Steps 202 through 206 may be done in parallel with steps 210 through 214 and step 208.

The compression offload hardware may be used to decompress the metadata and data stored in the vault drives when line power is restored. Alternatively, or additionally, the processors of the computing nodes may decompress the compressed metadata and/or data that was stored in the vault drives.

In some implementations the power conservation logic may advantageously enable use of less reserve power and thus lower capacity batteries. For example, and without limitation, the power conservation logic may enable use of batteries that do not trigger EPO standards and can be shipped with fewer restrictions. Smaller battery capacity may also translate to smaller system size and lower cost.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A storage node comprising:
a plurality of interconnected computing nodes, each of the computing nodes comprising a processor and volatile memory in which metadata is maintained, including new metadata created responsive to writes;
non-volatile storage media comprising non-volatile managed drives that are configured for data storage when line power is available and dedicated non-volatile vault drives that are reserved for storage of data and metadata during emergency shutdown of the storage node, wherein the computing nodes create at least one logical storage volume that is presented to hosts and the metadata comprises mappings between logical block addresses of the logical storage volume and address space of the non-volatile storage media;
compression offload hardware that compresses data being copied from the volatile memory to the non-volatile managed drives when line power is available;
a standby power source configured to provide power to the computing nodes and the dedicated non-volatile vault drives; and
power conservation logic responsive to loss of line power and emergency shutdown under power provided by the standby power source to select, based on estimated compressibility, at least some but not all of the new metadata in the volatile memory to be compressed into compressed metadata by the compression offload hardware and to prompt storage of the compressed new metadata on the dedicated non-volatile vault drives.

2. The apparatus of claim 1 wherein new metadata that is not selected for compression is stored in an uncompressed state on the dedicated non-volatile vault drives in response to loss of line power and emergency shutdown under power provided by the standby power source in parallel with compression of the selected new metadata by the compression offload hardware.

3. The apparatus of claim 2 wherein data that is not selected for compression is stored in an uncompressed state on the dedicated non-volatile vault drives in response to loss of line power and emergency shutdown under power provided by the standby power source in parallel with compression of the selected data by the compression offload hardware.

4. A method comprising: in a storage node comprising: a plurality of interconnected computing nodes, each of the computing nodes comprising a processor and volatile memory in which metadata is maintained, including new metadata created responsive to writes; non-volatile storage media comprising non-volatile managed drives that are configured for data storage when line power is available and dedicated non-volatile vault drives that are configured for use only for storage of data and metadata during emergency shutdown of the storage node; compression offload hardware that compresses data being copied from the volatile memory to the non-volatile managed drives when line power is available; and a standby power source configured to provide power to the computing nodes, wherein the non-volatile storage media, and wherein the computing nodes create at least one logical storage volume that is presented to hosts and the metadata indicates mappings between logical block addresses of the logical storage volume and the volatile memory and the non-volatile storage media, steps comprising: detecting loss of line power; and responsive to the loss of line power, initiating emergency shutdown under power provided by the standby power source, comprising: selecting, based on estimated compressibility, at least some but not all of the new metadata in the volatile memory to be compressed into compressed metadata by the compression offload hardware; and—5—prompting storage of the compressed new metadata on the non-volatile storage media.

5. The method of claim 4 wherein the non-volatile storage media comprises managed drives and vault drives and comprising destaging the compressed new metadata to the vault drives in response to loss of line power and emergency shutdown under power provided by the standby power source.

6. The method of claim 4 comprising selecting at least some data to be compressed into compressed data and destaging that compressed data to the non-volatile storage media responsive to loss of line power and emergency shutdown under power provided by the standby power source.

7. The method of claim 6 wherein the non-volatile storage media comprises managed drives and vault drives and comprising destaging the compressed data and compressed new metadata to the vault drives responsive to loss of line power and emergency shutdown under power provided by the standby power source.

8. The method of claim 4 comprising storing metadata that is not selected for compression in an uncompressed state on the non-volatile storage in response to loss of line power and emergency shutdown under power provided by the standby power source.

9. The method of claim 6 comprising storing data that is not selected for compression in an uncompressed state on the non-volatile storage in response to loss of line power and emergency shutdown under power provided by the standby power source.

10. A computer-readable non-transitory storage media on which is stored computer program code used by a storage node, the code comprising: power conservation logic responsive to loss of line power and emergency shutdown under power provided by a standby power source to select, based on estimated compressibility, at least some but not all of new metadata in volatile memory to be compressed into compressed new metadata by compression offload hardware and store the compressed new metadata on at least one dedicated, non-volatile vault drive that is configured for use only for storage of data and metadata during emergency shutdown of the storage node, wherein the metadata indicates mappings between logical block addresses of a logical storage volume and non-volatile storage media.

11. The computer-readable non-transitory storage media of claim 10 wherein the power conservation logic includes instructions that select at least some data to be compressed into compressed data and destage that compressed data to the at least one vault drive responsive to loss of line power and emergency shutdown under power provided by the standby power source.

12. The computer-readable non-transitory storage media of claim 10 wherein the power conservation logic includes instructions that store new metadata that is not selected for compression in an uncompressed state on the at least one vault drive in response to loss of line power and emergency shutdown under power provided by the standby power source.

13. The computer-readable non-transitory storage media of claim 10 wherein the power conservation logic includes instructions that store data that is not selected for compression in an uncompressed state on the at least one vault drive in response to loss of line power and emergency shutdown under power provided by the standby power source.

14. The computer-readable non-transitory storage media of claim 10 implemented in a SAN (storage area network) node.

* * * * *